US007596480B2

(12) United States Patent
Fung et al.

(10) Patent No.: US 7,596,480 B2
(45) Date of Patent: Sep. 29, 2009

(54) SOLUTION METHOD AND APPARATUS FOR LARGE-SCALE SIMULATION OF LAYERED FORMATIONS

(75) Inventors: Larry S. Fung, Dhahran (SA); Tareq M. Al-Shaalan, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 182 days.

(21) Appl. No.: 11/106,300

(22) Filed: Apr. 14, 2005

(65) Prior Publication Data

US 2006/0235667 A1  Oct. 19, 2006

(51) Int. Cl.
G06G 7/48 (2006.01)
(52) U.S. Cl. ........................................................ 703/10
(58) Field of Classification Search .................... 703/10
See application file for complete search history.

(56) References Cited

U.S. PATENT DOCUMENTS

| | | | |
|---|---|---|---|
| 5,321,612 | A | 6/1994 | Stewart |
| 5,710,726 | A | 1/1998 | Rowney et al. |
| 6,282,452 | B1 | 8/2001 | DeGuzman et al. |
| 6,826,520 | B1 | 11/2004 | Khan et al. |
| 6,928,399 | B1 | 8/2005 | Watts et al. |
| 6,980,940 | B1 | 12/2005 | Gurpinar et al. |
| 7,006,959 | B1 | 2/2006 | Huh et al. |
| 2002/0038201 | A1 | 3/2002 | Balaven et al. |
| 2002/0049575 | A1 | 4/2002 | Jalali et al. |
| 2002/0165671 | A1 | 11/2002 | Middya |
| 2002/0177986 | A1 | 11/2002 | Moeckel et al. |
| 2003/0225522 | A1 | 12/2003 | Poe |
| 2005/0267718 | A1 | 12/2005 | Guyaguler et al. |
| 2006/0036418 | A1 | 2/2006 | Pita et al. |

FOREIGN PATENT DOCUMENTS

EP  0881357  10/2004

OTHER PUBLICATIONS

Dogru et al.; A Massively Parallel Reservoir Simulator for Large Scale Reservoir Simulation; SPE 51886; presented at the 1999 SPE Reservoir Simulation held on Houston, Texas Feb. 14-17, 1999; 1-28.*

Vinsome, P.K.W. "Orthomin, an Iterative Method For Solving Spare Sets of Simultaneous Linear Equations", SPE 5729, 1976 SPE 5729, pp. 149-153, Fig. 1-7.

(Continued)

*Primary Examiner*—Hugh Jones
(74) *Attorney, Agent, or Firm*—Bracewell & Giuliani LLP (57) ABSTRACT

A targeted heterogeneous medium in the form of an underground layered formation is gridded into a layered structured grid or a layered semi-unstructured grid. The structured grid can be of the irregular corner-point-geometry grid type or the simple Cartesian grid type. The semi-unstructured grid is really unstructured, formed by arbitrarily connected control-volumes derived from the dual grid of a suitable triangulation; but the connectivity pattern does not change from layer to layer. Problems with determining fluid movement and other state changes in the formation are solved by exploiting the layered structure of the medium. The techniques are particularly suited for large-scale simulation by parallel processing on a supercomputer with multiple central processing units (CPU's).

20 Claims, 9 Drawing Sheets

OTHER PUBLICATIONS

Saad, Y., et al. "GMRES: A Generalized Minimal Residual Algorithm For Solving Nonsymmetric Linear Systems", Siam J. Sci. Stat. Comput., Jul. 1986, pp. 856-869, vol. 7, No. 3.

Holmes, J.A., "Enhancements to The Strongly Coupled . . . Well Control", SPE 12259 the 7th Reservoir Simulation Symposium, Nov. 1983, pp. 255-264 Figs. 1-5.

Wallis, J.R., et al. "Constrained Residual Acceleration Of Conjugate Residual Methods", SPE 13536, the 8th Reservoir Simulation Symposium, Feb. 1985, pp. 415-426 Tab 1-4.

Al-Shaalan, T.M., et al. "Modeling of Faults And Pinchouts in Parallel Environment", SPE SA 43, May 2004, Saudi Arabian Section, pp. 1-8.

Fung, L.S.K., et al., "Reservoir Simulation . . . Method", SPE Reservoir Engineering, Aug. 1992, pp. 349-357.

Fung, L.S.K., et al., "Hy-brid-CVFE Method For Flexible Grid Reservoir Simulation", SPE Reservoir Engineering, Aug. 1994, pp. 188-194.

Fung, L.S.K., et al., "Simulation of Block-to-Block . . . Reservoirs", SPE 20019, Proceedings of SPA CA Regional Mtg., Apr. 1990, and SPE Reservoir Engr., Nov. 1991, pp. 477-484.

Dogru, A.H., et al., A Massively Parallel Reservoir Simulator For Large Scale Reservoir Simulation,: SPE 51886, 1999 SPE Reservoir Simulation Symp., Houston, TX, Feb. 1999, pp. 1-11; Figs. 1-17.

Dogru, A.H., et al., "Simulation of Super K Behavior in Ghawer by a Multi-Million Cell Parallel Simulator", SPE 68068, Middle East Oil Show, Bahrain, Mar. 2001, pp. 1-10.

Stackel, A.W., et al., "An Example Approach to Predictive Well Management in Reservoir Simulation", Journal of Petroleum Technology, pp. 1087-1094, Jun. 1981.

Wijesinghe, A.M., et al., "A Comprehensive Well . . . Simulation," SPE 12260, 1983 SPE Symposium on Reservoir Simulation, San Francisco, Nov. 1983, pp. 267-281; Tab 1-11.

Mohammed, D.A., et al., "An Efficient Reservoir-Coupled . . . Simulator," SPE 8333, 1979 SPE Annual Technical Conf and Exh, Las Vegas, Sep. 23-26, pp. 1-6; Figs. 1-10.

Mrosovsky, I., et al., "Construction of a Large Field Simulator on a Vector Computer", Journal of Petroleum Technology, Dec. 1980, pp. 2253-2264.

"Total Well Management Aids Production of Beam Pumped Wells", Petroleum Engineer International, Oct. 1995, pp. 27, 29, 31-32, vol. 68, No. 10, Hart Publication, US.

Kaifeng, Yao, et al., "Hydrocarbon . . . Vector Machines", Adv. in Neural Networks, Intnl Sym. on Neural Networks Prec., Aug. 2004, pp. 537-542, vol. 1, Springer-Verlag Berlin, Germany.

Yeten, et al., "Optimization of Nonconventional Well Type, Location and Trajectory", Society of Pet. Engineers, Sep. 29, 2002-Oct. 2, 2002, SPE 77566, pp. 1-14.

Abate, et al., "Parallel Compositional Reservoir Simulation on a Cluster of PCs", The Intl. Journal of High Performance Computering Applications, 1998, pp. 1-10.

Wu, et al., "An Efficient . . . Fractured Media", Advance in Water Resources, vol. 25, Issue 3, Mar. 2002, pp. 243-261.

Litvak, M.L., "New Procedure for the Phase-Equilibrium Computations in the Compositional Reservoir Simulator," SPE Adv. Technology Ser., Feb. 28, 2002, pp. 113-121.

Dogru, A.H., et al., "A Parallel Reservoir Simulator for Large-Scale Reservoir Simulation," SPE Advance Technology Ser., Feb. 2002, pp. 11-23.

Dogru, A.H., et al., "Megacell Reservoir Simulation", SPE Advanced Technology Ser., May 5, 2000, vol. 52, No. 5, pp. 54-60.

Coats, Keith H., "An Equation of state Compositional Model", SPE 8284, Sep. 23-26, 1979, Dallas, Texas, pp. 363-376.

Coats, Keith H., "Compositional and Black Oil Reservoir Simulation", SPE Aug. 1998, pp. 372-379.

Wang, P., "A Fully Implicit Parallel EOS Compositional Simulator For Large Scale Reservoir Simulation", SPE 51885, Feb. 14-17, 1999, Houston, Texas, pp. 1-9.

Wang, P., Proper Use of Equations of State For Compositional Reservoir Simulation, SPE Distinguished Author Series, Paper, SPE 6907, Jul. 2001, pp. 74-80.

Wallace, D.J., et al., "A Reservoir Simulation Model With Platform Production/Injection Constraints for Development Planning of Volatile Oil Reservoirs", SPE 12261, pp. 285-291; Figs. 1-8; Nov. 15-18, 1983.

\* cited by examiner

$$A = \begin{bmatrix} P & B & & B & & & & & & & & & & & & \\ B & P & B & & B & & & & & & & & & & & \\ & B & P & B & & B & & & & & & & & & & \\ & & B & P & & & B & & & & & & & & & \\ B & & & & P & B & & B & & & & & & & & \\ & B & & & B & P & B & & B & & & & & & & \\ & & B & & & B & P & B & & B & & & & & & \\ & & & B & & & B & P & & & B & & & & & \\ & & & & B & & & & P & B & & B & & & & \\ & & & & & B & & & B & P & B & & B & & & \\ & & & & & & B & & & B & P & B & & B & & \\ & & & & & & & B & & & B & P & & & B & \\ & & & & & & & & B & & & & P & B & & B \\ & & & & & & & & & B & & & B & P & B & \\ & & & & & & & & & & B & & & B & P & B \\ & & & & & & & & & & & B & & & B & P \end{bmatrix}$$

$$P = \begin{bmatrix} t & t & & & & \\ t & t & t & & & \\ & t & t & t & & \\ & & t & t & t & \\ & & & t & t & t \\ & & & & t & t \end{bmatrix} \quad B = \begin{bmatrix} b & & & & & \\ & b & & & & \\ & & b & & & \\ & & & b & & \\ & & & & b & \\ & & & & & b \end{bmatrix}$$

$$A = \begin{bmatrix} P & B & & & B & B & & & & & & & & \\ B & P & B & & & B & B & B & & & & & & \\ & B & P & B & & & B & & & & & & & \\ & & B & P & & & & B & B & & & & & \\ B & & & & P & B & & & B & B & & & & \\ B & B & & & B & P & B & & & B & B & & & \\ & B & & & & B & P & B & & & B & B & B \\ & B & B & B & & & B & P & B & & & & B \\ & & B & & & & & B & P & & & & B \\ & & & & B & & & & & P & B & & \\ & & & & B & B & & & & B & P & B & \\ & & & & & B & B & & & & B & P & B \\ & & & & & & B & & & & & B & P & B \\ & & & & & & B & B & B & & & & B & P \end{bmatrix}$$

$$P = \begin{bmatrix} t & t & & & \\ t & t & t & & \\ & t & t & t & \\ & & t & t & t \\ & & & t & t \end{bmatrix} \quad B = \begin{bmatrix} b & & & & \\ & b & & & \\ & & b & & \\ & & & b & \\ & & & & b \end{bmatrix}$$

SOLUTION METHOD AND APPARATUS FOR LARGE-SCALE SIMULATION OF LAYERED FORMATIONS

BACKGROUND OF THE INVENTION

1. Field of Invention

The present invention relates to computerized simulation of hydrocarbon reservoirs in the earth, and in particular to simulation of fluid movement and other state changes in hydrocarbon reservoirs formed of layered formations.

2. Description of the Prior Art

In the oil and gas industries, the development of underground hydrocarbon reservoirs often requires the building of computer simulation models. These underground hydrocarbon reservoirs are often complex rock formations which contain both a petroleum fluid mixture and water, with the reservoir fluid content, often existing in two or more fluid phases. The petroleum mixture is produced by wells drilled into and completed in these rock formations.

Reservoir simulation belongs to the general domain of simulation of flow in porous media. However, reservoir simulation normally involves multiple hydrocarbon components and multiple fluid phases in an underground geological formation which is under high pressure and temperature. The chemical phase behavior of these hydrocarbon fluids and the included groundwater has to be taken into account in these simulators.

Sometimes, fluids such as water and/or gases are also injected into these rock formations to improve the recovery of the petroleum fluids. Simulation models therefore contain data which describe several types of information: the specific geometry of the rock formations and the wells, the fluid and rock property data, as well as production and injection history pertaining to the specific reservoirs of the oil or gas field in question.

Oil and gas companies have come to depend on reservoir simulation as an important tool to enhance the ability to exploit a petroleum reserve. Simulation models of reservoirs and oil/gas fields have become increasingly large and complex. The simulator (known in the petroleum industry as a reservoir simulator) which in the past has run these models was a computer operating under the control of a set of computer instructions or software. The software was in coded form, including some specific numerical algorithms and data constructs of an underlying mathematical model. The mathematical model which represented the physics of fluid movements in these hydrocarbon reservoirs was a system of nonlinear partial differential equations which described the transient multiple-phase, multiple-component fluid flow and material balance behaviors in these reservoirs. The fluid flow and material balance changes were induced by the production and/or injection of fluids as well as the pressure-volume-temperature (PVT) relationships of the reservoir fluids.

The reservoir simulator simulated the material balance and fluid flow in underground reservoirs and the included surrounding porous rock formations by subdividing the volume into contiguous cells known as grid blocks. A grid block was the basic finite volume where the mathematical model was applied. The number of grid blocks needed varied depending on the resolution needed for the simulation and the size of the reservoirs and oil and gas fields in question.

In the structured grid case, the finite difference stencil was typically 5-point or 9-point, in two dimensions, and 7-point or 11-point in three dimensions. The most common case for a structured grid in a three dimensional field-scale simulation was the 7-point stencil. In the semi-unstructured case, the in-layer part of the stencil could have an arbitrary number of connected points, whereas the vertical number of connected points was three. For each time step, the multiple-phase, multiple-component system of the nonlinear discretized material balance equations was typically iteratively solved using what was known as the generalized Newton's method. In the industry, this method has been usually referred to as the Newtonian iterations. At each Newtonian iteration, a linear system of equations was constructed where the matrix, known as the Jacobian matrix, and the right-hand-side vector, known as the residuals, were used to solve for the change in the primary variables of the system.

In the time discretization, when all the primary variables were taken at the new time level of the time step, the method was considered fully implicit (FI). When only the pressure variable was taken at the new time level while all other variables, such as concentration or saturation, were taken at old time level of the time step, it was known as implicit pressure explicit saturation (IMPES). IMPES solved one equation (the pressure equation) per grid block per time step implicitly and was far cheaper computationally than FI, but had stability limitations which constrained the time step size. There were other schemes which adjusted the implicitness dynamically on a cell-by-cell basis, which were known generally as an adaptive implicit method (AIM).

An industry practice for solving this linear system of equations was via a preconditioned iterative method, as the system was normally too big to be solved by a direct method such as Gaussian elimination. The typical state-of-the-art preconditioner used in the industry was nested factorization (NF) or incomplete LU factorization (ILUF) which generated approximate upper (U) and lower (L) triangular matrices. The procedure was highly recursive in nature and was not conducive to parallel implementation.

At the same time, computer hardware has evolved rapidly to become inexpensive and fast. With the availability of fast and inexpensive, commodity-based multi-processor machines such as PC clusters, there was an increasing demand for effective use of these inexpensive systems.

The measure of efficiency of a computational algorithm in parallel computing is its scalability. A method is considered to be perfectly scalable or to have a one hundred percent parallel efficiency if it takes one hour to solve the problem on the computer with a single CPU; 0.5 hours if the work is exactly divided out and given to two CPU'S; the time to solve the same problem using four CPU's is 0.25 hours; and so on. That is, there is no parallelization overhead when a perfectly scalable method is used. This is an ideal situation. In reality, many reasons can cause the solution time on a real system to be far from this ideal.

When the problem was too large to be solved using a single CPU, the grid was decomposed into smaller blocks or chunks, called sub-domains, each to be worked on by a separate CPU. However, this partitioning was artificial and the sub-domains of the grid were in fact connected and communicated with each other. In a reservoir simulation, there must be continuity of flow, pressure, and temperature field across the sub-domain boundaries. Since the native scalar method was recursive and was not easily parallelizable, a multi-level method, for example the additive Schwarz method, or others, was typically used.

The recursive algorithm, like the ILU factorization method, was applied in the local sub-domain and a global iteration step was applied to resolve the discrepancy along the boundaries of the sub-domains. This work to resolve the domain boundaries typically increased as the number of processors (and thus the number of sub-domains) used to solve the system increased. This posed limits on the scalability inherent to this type of extension. Additionally, the convergence of the solution also depended on the additional level of iterations and the number of sub-domains or CPU's used to solve the problem. Hence, the results usually were somewhat different when a different number of CPU's was used to solve the same problem while everything else remained equal. The simulation results for the same model but using a different number of processors were not the same. This could lead to interpretation problems, verification problems, and added uncertainty in the results.

The primary methodology for solving the linear system of the class of simulation problem in question involved nested factorization or incomplete LU factorization, which were recursive algorithms. As discussed earlier, the predominant method for parallel computation was in the form of domain decomposition where a global iterative step was constructed to solve the partitioned system which by the physical nature of the reservoir was tightly coupled. This global iteration was therefore, so far as is known, the standard technique added in the parallel computing environment involving the concurrent use of multiple processors. It was not needed in the serial (single CPU) application. In general, the existing methods had significant dependency on the number of processors used in parallel to solve a problem.

The prior methods used different iterative sequences in parallel simulation as compared to serial simulation. For the same problem, a parallel simulation had an added level of global iterations in parallel processing which increased the processing complexity of the work. This lead to a loss of efficiency as processor count increased.

The simulation results for the same model but using a different number of processors were not the same. This could lead to interpretation problems, verification problems, and added uncertainty in the results.

SUMMARY OF INVENTION

Briefly, the present invention provides a new and improved method of computerized simulation of state changes of fluids in underground layered formations in the earth. A formation layer of the underground formations is partitioned into a grid formed of a number of laterally contiguous grid cells. Representations of state changes for the grid cells with adjacent grid cells are established for the laterally contiguous grid cells.

The established representations of state changes for the grid cells are arranged into a matrix according to the position in the formation of the grid cells.

The established state change matrix is partitioned into a matrix diagonal and layer connectivity of the grid cells, and another matrix representing lateral connectivity of the grid cells. Matrix-vector multiplication operations are then performed in the computer as a series expansion to form an approximate inverse matrix in the computer. A conjugate residual interactive solution is then applied in the computer to solve the representations of the state changes and obtain a residual. The steps of performing matrix-vector multiplication and applying a conjugate residual interactive solution are iteratively repeated in the computer until the obtained residual is within an established tolerance limit of accuracy.

The present invention also provides a data processing system for computerized simulation of state changes of fluids in underground layered formations in the earth. The data processing system includes a processor which performs the sequence of processing steps of computerized simulation and a memory which stores the results obtained by the processor according to the present invention.

The present invention further provides a computer program stored in signal bearing media for causing a data processor to simulate state changes of fluids in underground layered formations in the earth. The computer program product contains instructions stored in machine-readable code which cause the data processor to perform the steps of computerized simulation of state changes of fluids in underground layered formations according to the present invention.

BRIEF DESCRIPTION OF THE DRAWINGS

The objects, advantages and features of the invention will become more apparent by reference to the drawings appended thereto, wherein like numerals indicate like parts and wherein an illustrated embodiment of the invention is shown, of which.

DESCRIPTION OF THE PREFERRED EMBODIMENT

The method in the present invention solves a linear system of equations arising from a typical structured or semi-unstructured discretization of a fluid flow model in a layered heterogeneous porous geological formation in the underground. A particular application is in a reservoir simulator which models the changes over time (transient) of material balance and fluid flow behaviors of a multiple component, multiple phase system involving hydrocarbon fluids plus groundwater. The formation is typically a very large one, which has been partitioned into a grid formed of a number of laterally contiguous grid cells. The number of grid cells normally is in the hundreds of thousands to several millions in a typical field-scale simulation. For each grid cell, a multi-equation system for tracking the material balance of each fluid component and fluid phase pressure is used.

Typically, the formation geometry is such that the lateral extent (typically in kilometers) is orders of magnitude larger than the thickness (typically in tens of meters). A typical grid cell in a structured discretization, like those of either the corner-point-geometry (CPG) or Cartesian, is a hexahedron, shaped like a rectangular pancake. Similarly, in the semi-unstructured discretization, where the grid is unstructured in the lateral dimension and layered in the third dimension, the grid cell is a honeycomb-like, pancake-shaped polyhedron. This has specific implications on the fluid transmissibility coefficients which enter into the calculation of the coefficient matrix.

The solution method in the present invention primarily targets the simulation and modeling of the domain of fluid flow in underground formations. This formation is typically layered due to the geology. The fluid can involve a multi-component, multi-phase mixture of hydrocarbon fluids and water. A particular and important application for the present invention is that of reservoir simulation, commonly used by oil and gas companies as an essential tool for reservoir management of their oil and gas assets.

As will be set forth below, the present invention embeds the block form for the inversion of a tridiagonal system for the representation of the flow in the column of cells for the system matrix inside an approximate block matrix inversion procedure of the truncated Taylor (or Neumann) series expansion type. This approximate inverse via series expansion is used as a preconditioner to a generalized conjugate residual (GCR) iterative procedure. In fact, it is advantageous that the approximate inverse matrix not be generated explicitly. Rather, the successive updates to the approximate solution vector are calculated as a series of matrix-vector multiplications in the preconditioning step.

When a simulation model is too large to be run on a single CPU computer, a supercomputer with multiple CPU's is employed to solve the system with the present invention. The data for the solution system is decomposed in the lateral extent but not in the vertical extent. In the structured grid setting, this decomposition is simply the uniform partitioning of grid cells in the X and Y dimensions corresponding to those of the subsurface reservoir into the corresponding computing processors. In the semi-unstructured grid case, the partitioning in the lateral dimension (2D) can be done using conventional grid partitioning software. A suitable example of such grid partitioning software is that available as the public domain software identified as PARMETIS.

The present invention provides for solution in a computer or group of computers by either a serial or a parallel solution of a linear system of equations of the general form

[A]x=r allowing users to solve the nonlinear system of equations of the multiple phase multiple component fluid flow in a layered underground formation.

Figure 1:
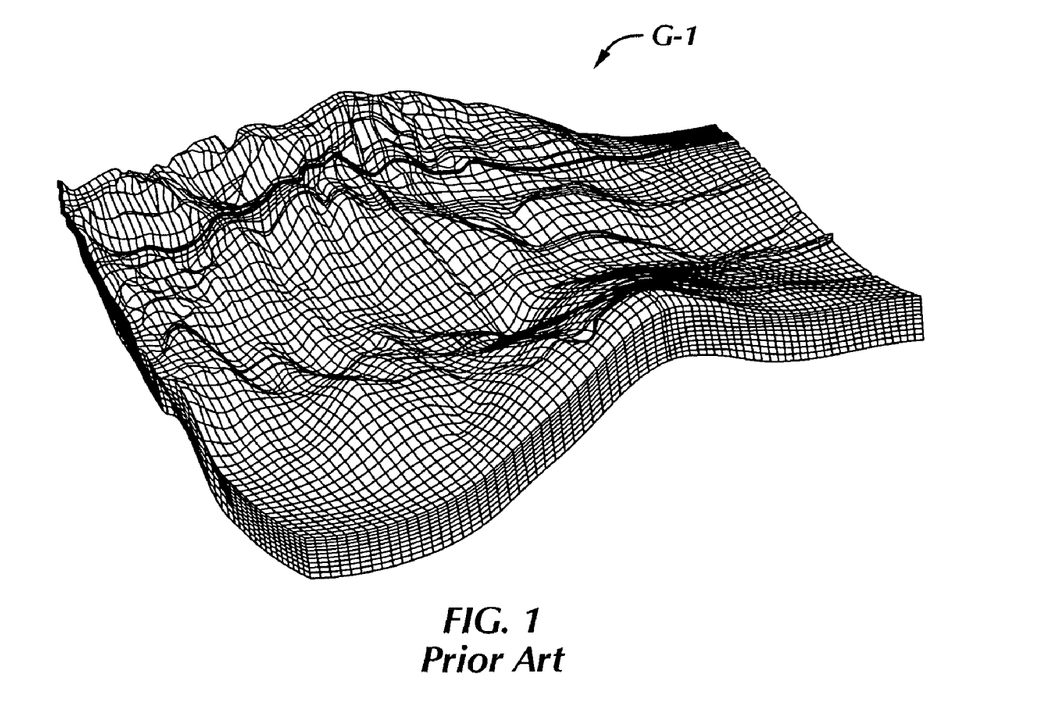
FIG. 1 is an isometric view of a computerized model of a subsurface reservoir structured grid.
Figure 2:
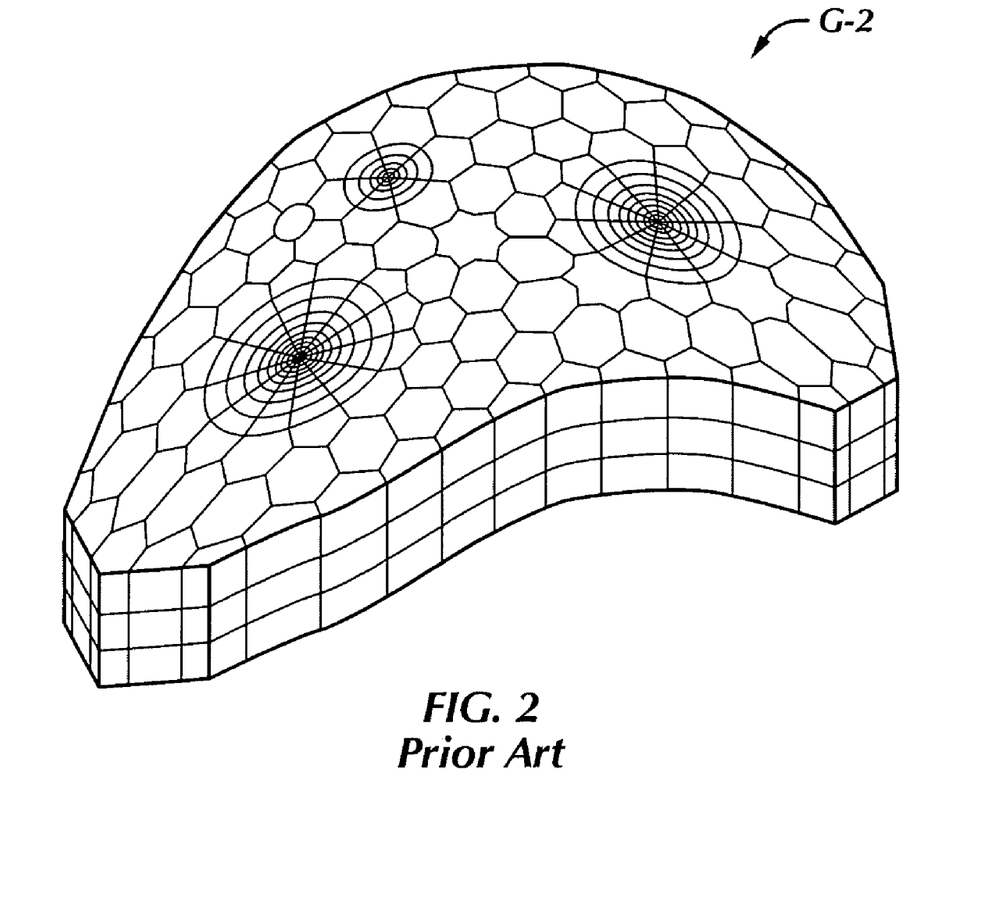
FIG. 2 is a diagram of an example layered, unstructured hybrid grid.
Figure 3:
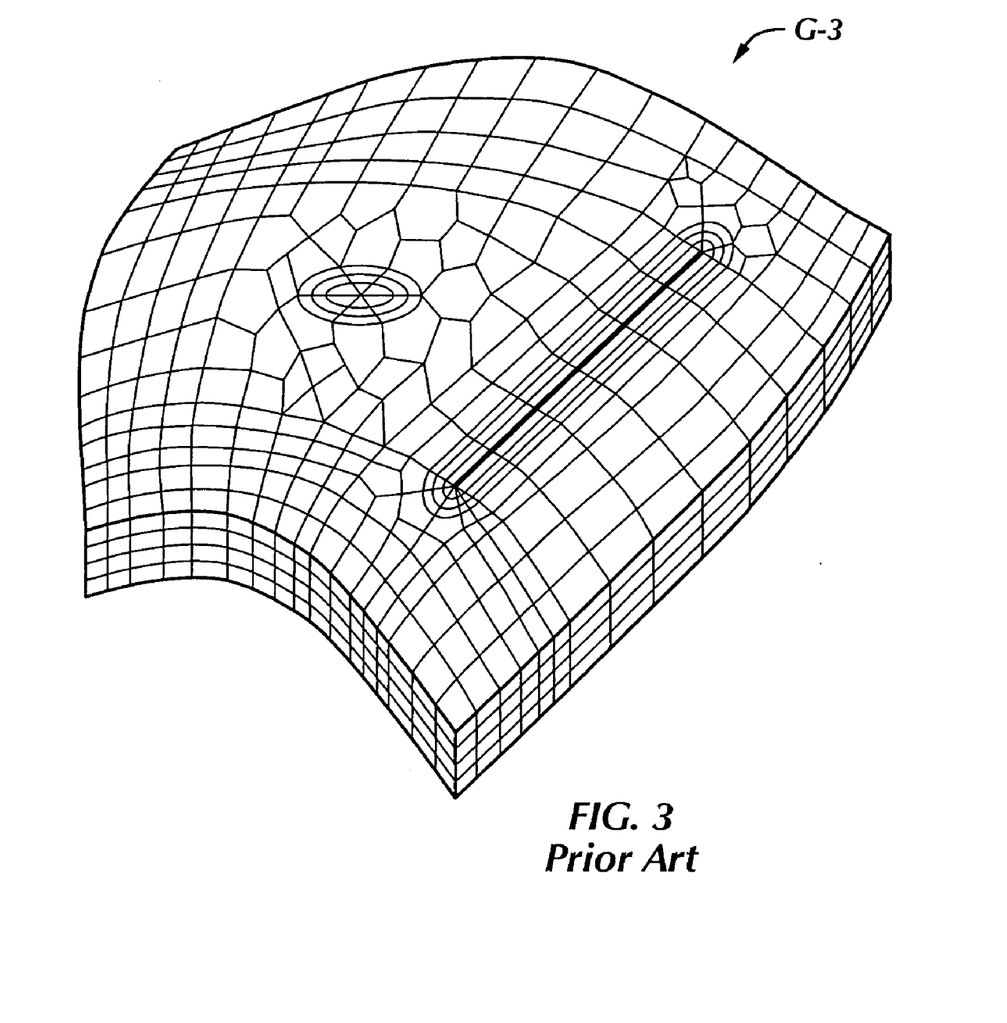
FIG. 3 is a diagram of an example of a hybrid grid constructed on a structured corner-point-geometry (CPG) grid type.

The solution obtained according to the present invention is particularly targeted to the field-scale modeling of the domain problem where the grids can be a structured grid G-1 as shown in FIG. 1; or a semi-unstructured grid G-2 as shown in FIG. 2; or a combined hybrid structured/unstructured grid G-3 as shown in FIG. 3. A structured grid with the typical I, J, K indexing can be faulted with disappearing layers known as pinch-outs. This grid type is known to reservoir simulation specialists as corner-point-geometry (CPG). The second or semi-unstructured grid type such as shown in FIG. 2 is based on control volume generated from a triangulation (Voronoi or CVFE). This type of grid is sometimes referred to as 2.5D grid. The third type is a composite grid on the domain where some part is gridded in a structured way and another part can be gridded in an unstructured way. The one requirement in connection with the present invention is that the grid is layered.

Descriptions of these grid types can be found in: T. M. Al-Shaalan & L. S. Fung, "Modeling of Faults and Pinchouts in Parallel Environment", paper SPE SA 43, Society of Petroleum Engineers. Saudi Arabian Section, May 2004; Balaven, S. et al, "Method of Generating a Grid on a Heterogeneous Formation Crossed by one or more Geometric Discontinues in order to Carry out Simulation", US Published Patent Application No. 2002/0038201 A1, Mar. 28, 2002; L. S. K Fung et al, "Reservoir Simulation with a Control-Volume Finite-Element Method", SPE Reservoir Engineering, August 1992, p. 349-357; and L. S. K. Fung et al, "Hybrid-CVFE Method for Flexible Grid Reservoir Simulation", SPE Reservoir Engineering, August 1994, p. 188-194.

The present invention treats the underground formation of interest in the earth as being formed of a sequence of layers, and the gridding structures or types selected also naturally have this layered structure. The method can handle a structured grid system such as the CPG system, which can have faults and pinch-out layers. The gridding can also be a laterally unstructured system such as the PEBI or CVFE gridding system. These are sometimes referred to as 2.5D unstructured grids. Since the grid is layered, the method however does not treat a general 3D, unstructured gridding system.

By way of explaining the methodology, let NC be the number of columns of cells in a typical discretization, and NP be the number processors engaged to solve a particular problem. The data is distributed approximately as NC/NP, which means the work load is roughly balanced. In the structured grid case then NC=NX*NY where NX and NY are the number of grid cells in the I and J directions. The data partitioning can conveniently be NX/NPX and NY/NPY and NP=NPX*NPY. Note that data is not partitioned in the K direction. In the serial processing embodiment with a single CPU, NP=NPX=NPY=1 which is the serial application of the method. The partitioning for the structured case is normally achievable by simple inspection of the grid dimensions and a choice of the number of processors to be used. The partitioning for the semi-unstructured grid or the hybrid grid type will normally require a grid partitioning tool, such as PARMETIS, as noted above.

Explaining further, let the total number of grid layers in a formation be NL, then the total number of grid cells in the formation is NC*NL. In the method of the present invention, it is preferable that a block diagonal scaling step be applied to scale all the equations for each cell. Block diagonal scaling is achieved by multiplying each block equation (a total of NC*NL equations) by the inverse of its diagonal block matrix. The result is that the NC*NL diagonal blocks become the identity matrix. It should be understood, however, that the block diagonal scaling step is not mandatory, but rather simply preferable.

Figure 4A:
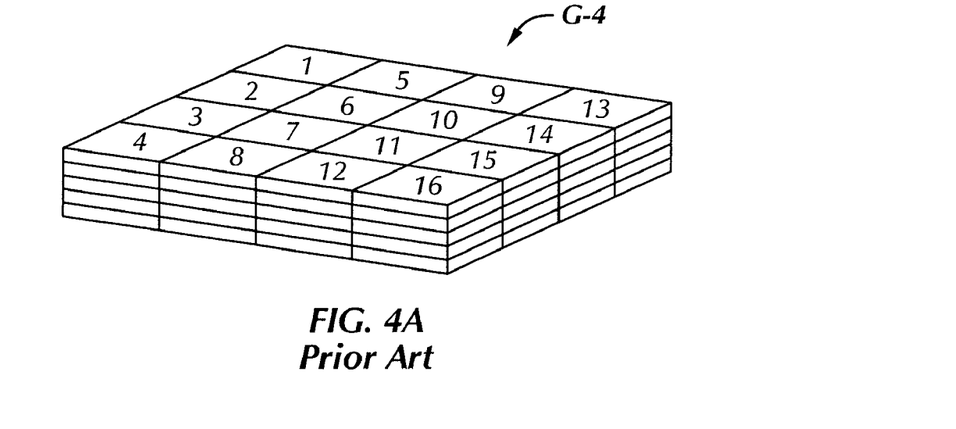
FIG. 4*a* is an illustrative example of a layered subsurface reservoir structured grid.
Figure 4B:
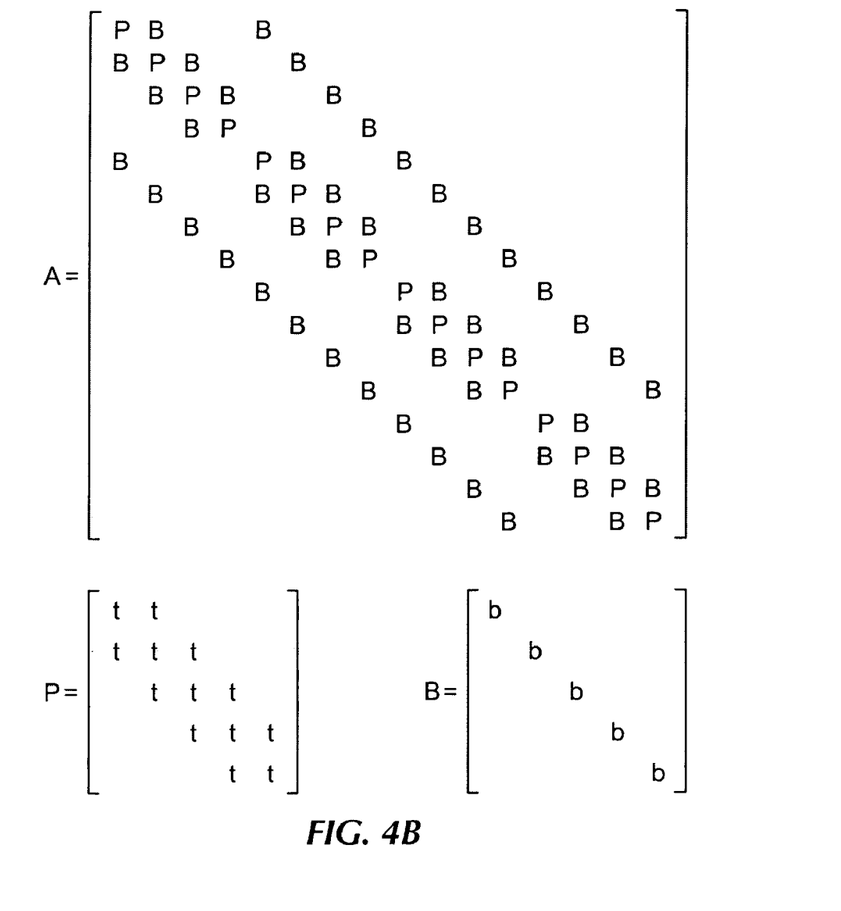
FIG. 4*b* is an example diagram of a partitioned matrix structure assigned to the grid of FIG. 4*a*.
Figure 5A:
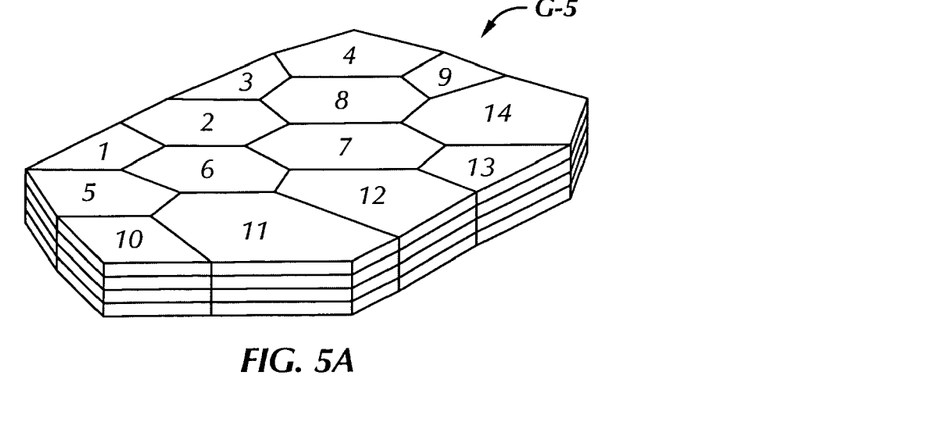
FIG. 5*a* is an illustrative example of a layered subsurface reservoir unstructured grid.
Figure 5B:
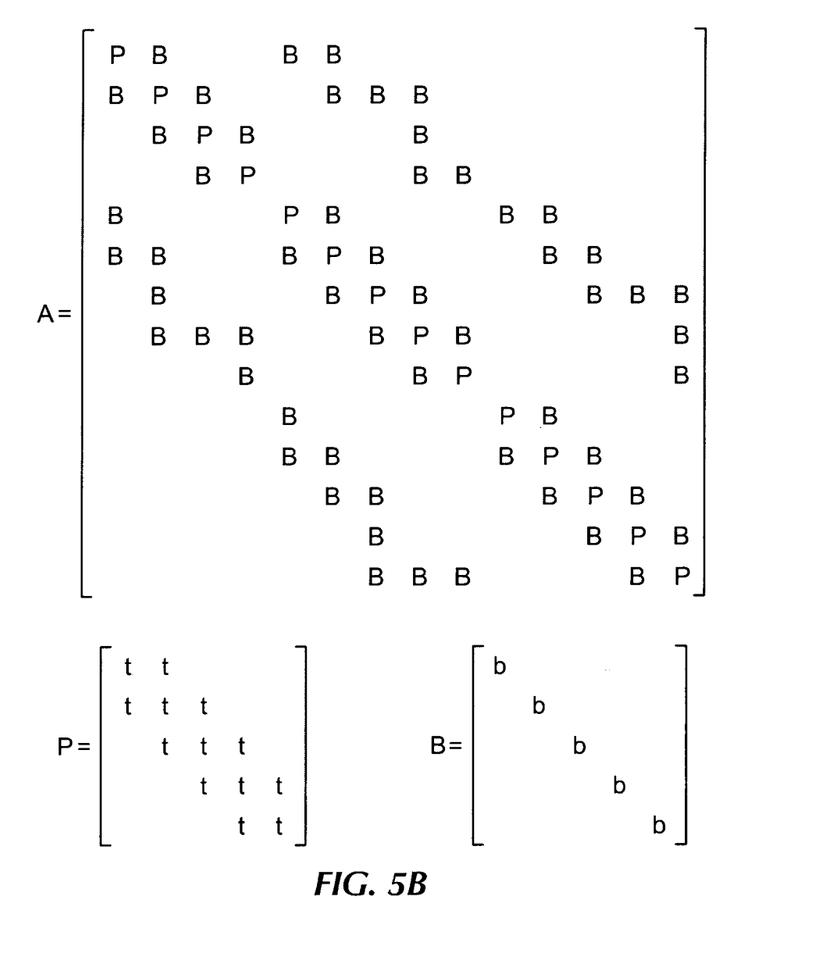
FIG. 5*b* is an example diagram of a partitioned matrix structure assigned to the grid of FIG. 5*a*.

The matrix [A] for a structured grid G-4 (FIG. 4a) is as shown in FIG. 4b partitioned as [P+B] where the partitioned component P of the matrix [A] represents the diagonal plus the layer connectivity, and the partitioned component B of the matrix [A] represents the lateral connectivity. The lower case letters t and b in the matrices [P] and [B] of FIG. 4b represent square matrices of state of change equations or representations for each grid cell, each of NEQ rows by NEQ columns. The foregoing definition and partitioning of the matrix [A] according to the present invention is applicable for any of the grid type described above. Another illustrative example and for an unstructured grid G-5 (FIG. 5a) is shown, where the matrix [A] is partitioned as shown in FIG. 5b into a diagonal plus layered component [P] in a matrix [P] and the partitioned component B represents the lateral connectivity of the matrix

[A], with the lower case letters t and b representing square matrices of the type discussed above for FIG. 4b.

For the matrix [A] as so defined, then its inverse matrix [A$^{-1}$] can be defined as follows:

$$[A^{-1}] = [I+P^{-1}*B]^{-1}[P^{-1}]$$

The matrix component [P] is block tridiagonal for the single media (single porosity, single permeability or SPSP) representation and is block pentadiagonal for the dual media (dual porosity, dual permeability or DPDP) representation of the layered formation. The matrix component [B] is block banded if the grid is structured and is block sparse if the grid is unstructured. Each non-zero element of [P] and [B] is a block matrix of size NEQ*NEQ where NEQ is the number of equations to be solved for each grid cell.

A single porosity, single permeability representation, also known as SPSP representation, is a conventional technique used to represent flow in porous media. SPSP representation is well known to those engineers and scientists working in reservoir simulation and in flow representation in porous media.

A description of a DPDP medium representation of a formation can be found in: L. S K. Fung, "Simulation of Block-to-Block Processes in Naturally Fractured Reservoirs", paper SPE 20019, proceedings of the SPE California Regional Meeting, April 1990 and SPE Reservoir Engineering. November, 1991, p. 477-484.

The schematic data store for implementation of the present invention has the forms:
- (NEQ*NEQ, NL, NC) and (NEQ*NEQ, NL, NC, NV), where NV is 3 for an SPSP or single media representation, and is 5 for a DPDP or dual media representation; and
- (NEQ*NEQ, NL, NS), where NS is the total number of lateral connections and is NC*4 for a structured grid with a 7-point stencil dimensions.

Let E=[-P$^{-1}$*B] and the approximate inverse as M$^{-1}$ then the approximate inverse M$^{-1}$ of [P][I-E] using the truncated Neumann series expansion is [I-E+E$^2$-E$^3$+E$^4$-E$^5$+E$^6$-E$^7$ ... ][P$^{-1}$]. The choice of the number of terms used is flexible depending on the balance between accuracy and the amount of computational work to be applied in the preconditioning stage of the solution desired by the user of the method. It should be clear from these that the method becomes a series of matrix-vector multiplication operations and the approximate inverse matrix is not computed explicitly.

A generalized conjugate residual (GCR) iterative method for nonsymmetric matrices is then applied to solve the system with the aforementioned approximate inverse as a preconditioning step to a user specified tolerance of residual. The type of iterative procedure used in this step is one of the methods as described in the following: P. K. W. Vinsome, "Orthomin. an Iterative Method for Solving Spare Sets of Simultaneous Linear Equations", paper SEE 5759, Society of Petroleum Engineers, 1976; and Y. Saad & V. H. Schultz, "GMRES: a generalized minimal residual algorithm for solving nonsymmetric linear systems", SIAM J. Sd. Stat. Comput., Vol. 7. No. 3, July 1986. p. 856-869.

Figure 6A:
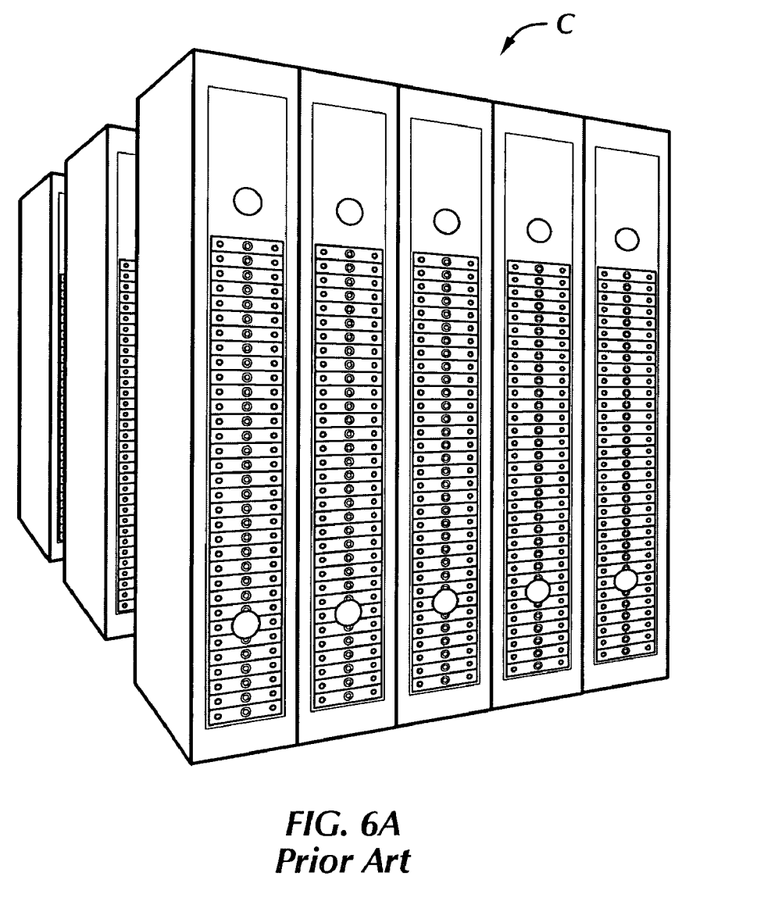
FIGS. 6*a* and 6*b* are schematic diagrams of example computer systems for use with the present invention.

The above matrix assignment and partitioning, storage and matrix vector multiplication operations can be run in either a serial mode or a parallel mode, as the size of the reservoir being simulated may require. Accordingly, implementation may be made in a variety of processor arrays, as will be described below. FIG. 6a shows a rack mounted PC-cluster C which may be used, for example.

Figure 6B:
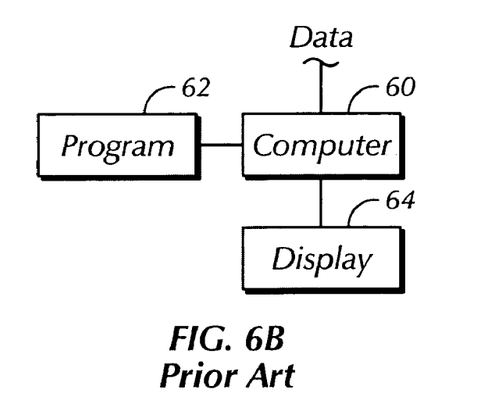

In any case, the processor of the computer as shown schematically at 60 (FIG. 6b) receives the data concerning the field of interest to undertake the logic of the present invention, which may be executed by a processor as a series of computer-executable instructions. The instructions may be contained on a data storage device 62 with a computer readable medium, as shown, having a computer usable medium stored thereon. Or, the instructions may be stored in memory of the computer 60, or on magnetic tape, conventional hard disk drive, electronic read-only memory, optical storage device, or other appropriate data storage device. The results of the processing are then available on a display as shown at 64 or printer or any other form of output device.

Figure 7:
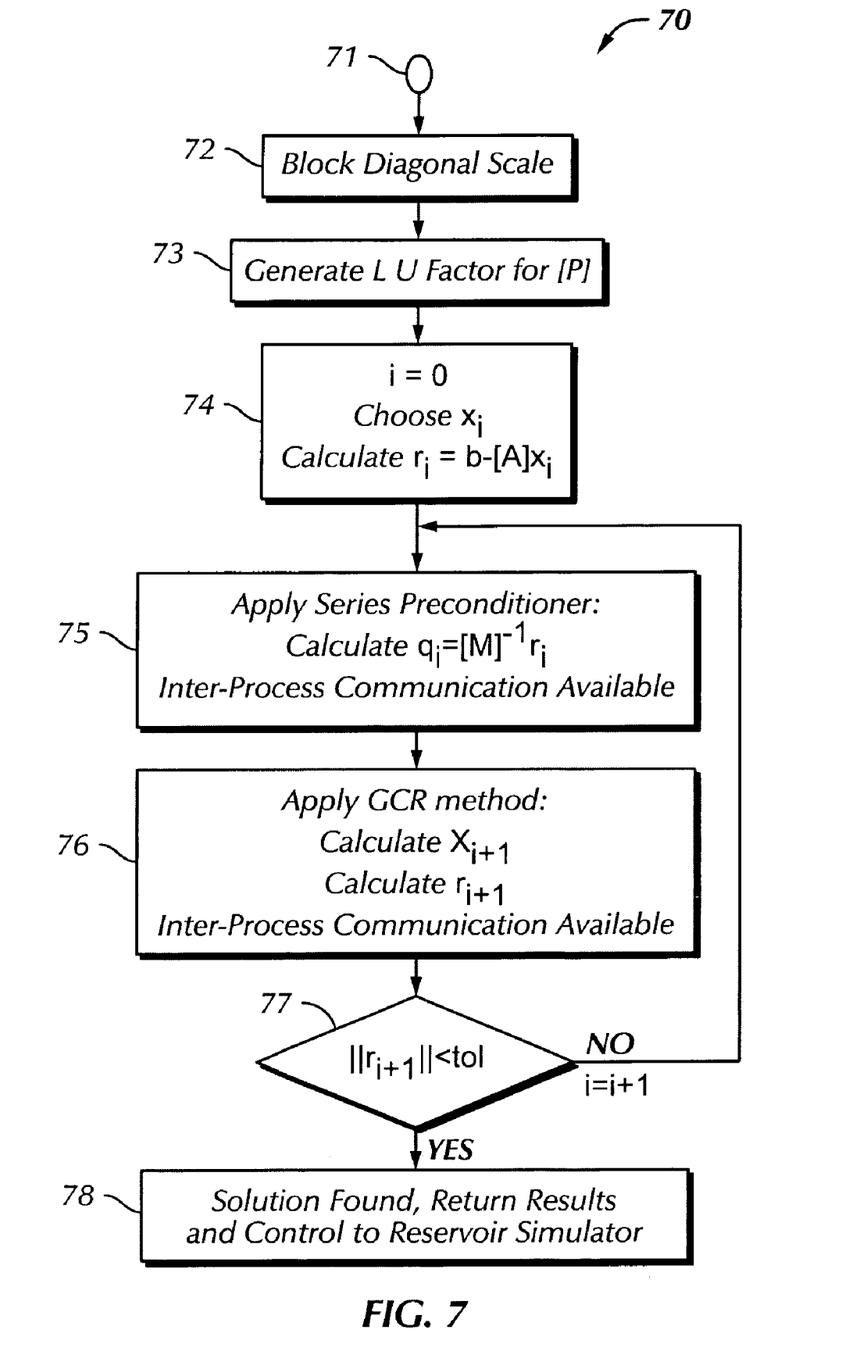
FIG. 7 is a flow chart of processing steps performed according to the present invention.

The flow chart of FIG. 7 herein illustrates the structure of the logic of the present invention as embodied in computer program software. Those skilled in the art will appreciate that the flow charts illustrate the structures of computer program code elements including logic circuits on an integrated circuit that function according to this invention. Manifestly, the invention is practiced in its essential embodiment by a machine component that renders the program code elements in a form that instructs a digital processing apparatus (that is, a computer) to perform a sequence of function steps corresponding to those shown.

It is important to note that, while the present invention has been, and will continue to be, described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives, and CD ROMs, and transmission-type media such as digital and analog communication links.

It should be understood that the processing described herein can be implemented in a variety of other types of reservoir simulators. It can be run on a variety of computer platforms, such as single CPU, a shared memory parallel or massively parallel processing computer, a distributed memory super-computer, and a variety of PC clusters, such as a self-made PC cluster, or a production PC cluster.

A schematic flow chart of the processing according to the present invention is shown in FIG. 7. In the sequence of FIG. 7, a flow chart 70 indicates a sequence of processing steps according to the present invention. The processing sequence is entered at 71 from a main reservoir simulator processing sequence of the type described herein. During a first processing step 72 a block diagonal scaling is performed to scale the flow representation equations for each cell. This is done by multiplying each block equation by the inverse of its block diagonal matrix, as discussed above.

Next, during a step 73, an LU facturization is performed to generate upper and lower triangular matrices for the [P] matrix. Then, during a step 74, an iteration counter i is set to 0, and an estimate $x_i$ and is selected so that a matrix calculation $$r_i = b - [A]x_i$$

may be made.

In a step 75, a series preconditioner is applied to calculate the results of the following expression:

$$q_i = [M]^{-1} r_i$$

This computation is performed using the truncated Neumann series expansion in the manner described above. If a parallel computation array is being used, communication between adjacent processors is done during step 75, in a manner to be described below.

Next, during step 76, a generalized conjugate residual or GCR method is applied to solve the system of equations, as described above. Again if a parallel computation array is in use, communication between adjacent processors is performed.

In step 77, the residual result obtained during step 76 is compared with a user specified tolerance of residual. If the obtained residual result is not within the user specified tolerance, the iteration counter i is incremented and processing returns to step 75 for another processing cycle in the manner described above for subsequent iterations.

Processing proceeds in the foregoing manner until a solution value for the residual is found within the user specified tolerance range during step 77 of an iteration cycle. At this time, a step 78 is performed and the results obtained for the computed state changes of the fluids yielding the satisfactory residual in the grid cells are stored in memory of the processor or processors proceeding according to the instruction steps of FIG. 7. Control of the processor or processors then reverts to the main reservoir simulator sequence.

The procedure is the same for both the serial application and the parallel application of the method. In the parallel application of the method, an interprocessor communication step is performed prior to the matrix-vector multiplication where the elements of the intermediate solution vector situated at the boundary of a data partition need to be exchanged between the processors sharing an internal domain boundary.

Figure 8:
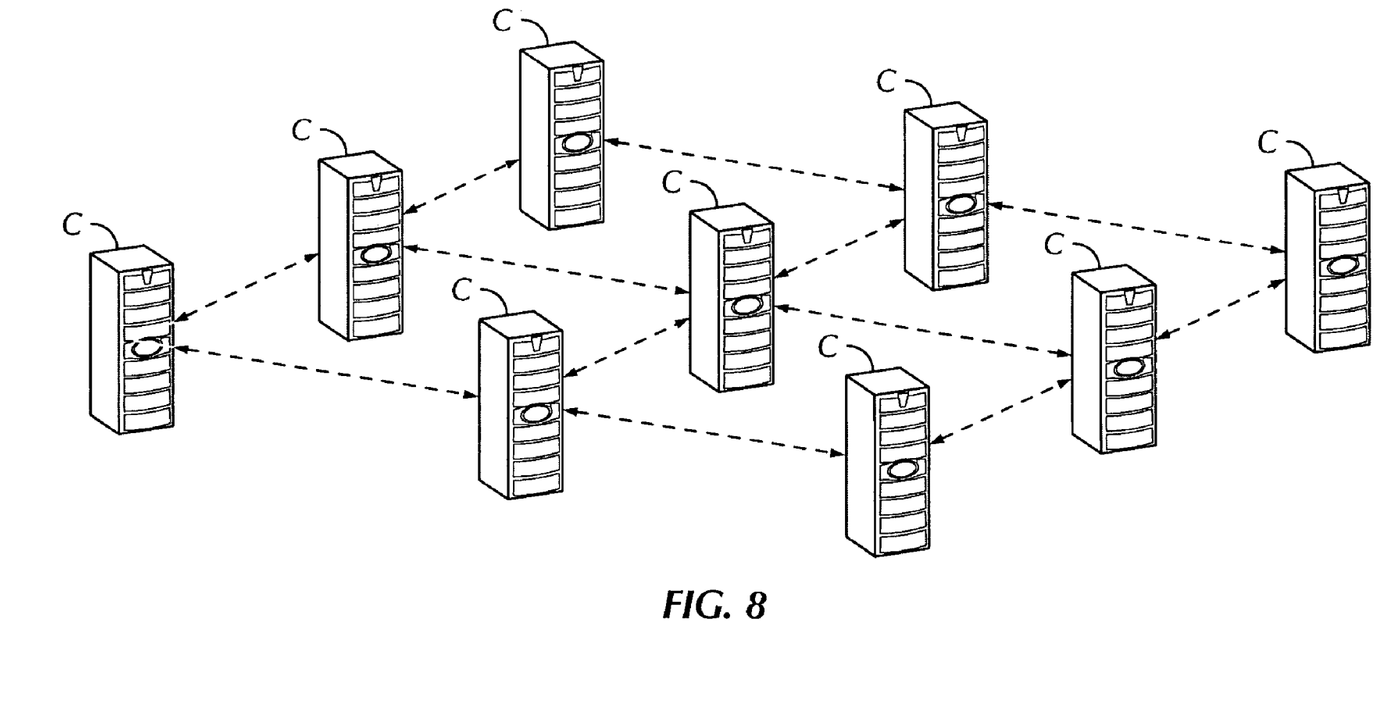
FIG. 8 is an illustrative example of data communication of a processor array of a computer system for parallel processing of data from a subsurface reservoir structured grid.
Figure 9:
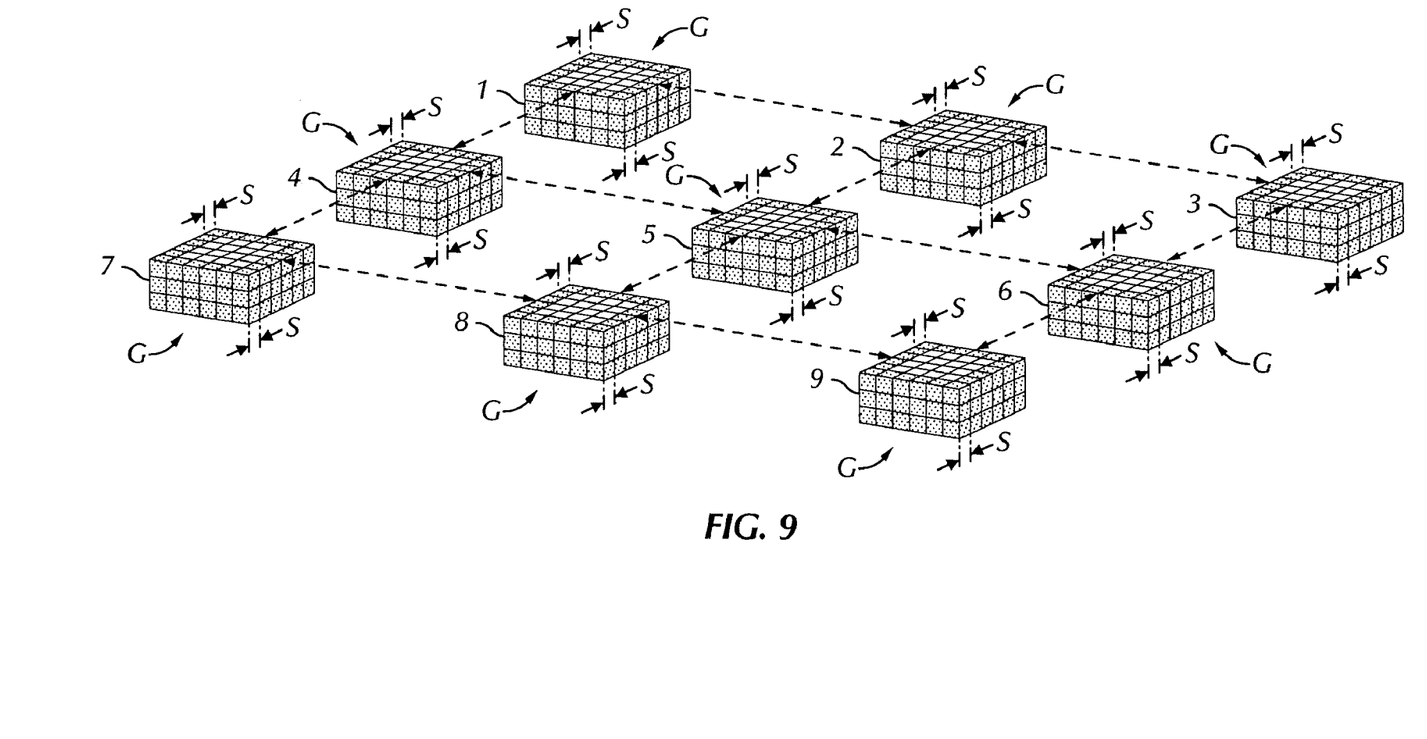
FIG. 9 is an example of data partitioning and communication for a layered subsurface reservoir structured grid for processing in the array of FIG. 8.

The boundary data which needs to be communicated to an adjacent processor is illustrated in FIGS. 8 and 9. This takes the form of a boundary strip S of data one cell thick to be communicated among the adjacent processors C sharing the common boundary. Data store for the strip S shared with the processor's neighbors is provided on the processor. This communication step is not needed in the serial case.

It should be noted that additional sub-steps can be introduced into the basic method outlined in this invention and are beneficial to increase the flexibility or capability of the basic scheme for certain simulation problems targeted by the method. These are considered optional sub-steps which can be added into the overall solution method of the present invention. Their addition does not change the basic procedure of the method nor introduce caveats to the fundamental claims of the invention. Two optional sub-steps have been added and used on occasion in actual applications. The first is the treatment of fully implicit well, in both the serial and the parallel mode of application, according to the techniques described, for example, in J. A. Holmes, "Enhancements to the Strongly Coupled, Fully Implicit Well Model: Wellbore Crossflow Modeling and Collective Well Control", paper SPE 12259, the Reservoir Simulation Symposium, Society of Petroleum Engineers, November 1983.

The second is another published procedure, known by domain experts as the constrained pressure residual (CPR) method, and is also readily incorporable as a sub-step in the current overall method. The procedure uses the pressure solution as a constraint to accelerate the overall convergence rate of the global system. An example description of this procedure is: J. R. Wallis et al, "Constrained Residual Acceleration of Conjugate Residual Methods", paper SPE 13536, the 8th Reservoir Simulation Symposium, Society of Petroleum Engineers. February 1985. It does additional work to generate an approximate pressure solution for each iteration in return for a fewer total iteration count. This has been adapted to fit into the current method for both the serial and the parallel mode of application.

The method of the present invention is naturally parallel in that the algorithm is identical in both the serial mode (one CPU) and the parallel mode (multiple CPU's). It is to be noted that the result does not depend on the number of CPU's or sub-domain used to solve the problem. It gives the same result for the same simulation model regardless of the number of CPU's used to solve the problem. While actual scalability depends on the specific implementation of the method, the method itself is fully parallel. The only tangible overhead comes from the inter-processor communication cost of the required sub-domain boundary data, which is small for reasonable sized sub-domains. This allows good scalability to be maintained when a large number of CPU's is used to solve the large-scale simulation system.

The parallel implementation of the method can be performed through the use of the message passing interface (MPI) standard for distributed memory application, or the OPENMP standard for the shared memory application, or it can be a mixed paradigm approach using a mixture of MPI and OPENMP parallelism. Examples of these types of parallel implementation in connection with reservoir simulation are: disclosed in commonly owned, co-pending U.S. patent application Ser. No. 10/916,851 filed Aug. 12, 2004, entitled "A Highly Parallel, Implicit Compositional Reservoir Simulator for Multi-Million Cell Modules". It should also be understood that other parallel implementation techniques might also be used, if desired. It should be understood that other inter-processor communication protocols may also be used for this aspect. Another example implementation of a reservoir simulator of the mixed paradigm type using MPI and OpenMP is that disclosed in Dogru, A. H., et al, "A Massively Parallel Reservoir Simulator for Large Scale Reservoir Simulation," Paper SPE 51886 presented at the 1999 SPE Reservoir Simulation Symposium, Houston Tex., February 1999 and by Dogru, A. H., Dreiman, W. T., Hemanthkumar, K. and Fung, L. S., "Simulation of Super K Behavior in Ghawar by a Multi-Million Cell Parallel Simulator," Paper SPE 68066 presented at the Middle East Oil Show, Bahrain, March 2001.

The method of the present invention is highly scalable to large number of CPU's because the work count does not increase with the number of processors used. Current method has increase work count with an increase in the number of processors or sub-domains because the partition surface area increases and the work required to iterate out the discrepancies across the inter-domain boundaries also increases which usually leads to poorer scalability as the processor count increases.

The method of the present invention does not require domain decomposition with a global interactive step, as was the case in other prior methods. As a result, the calculated results using the present invention is the same independent of the number of CPU's used. The method of the present invention does not follow the class of domain decomposition methods but is rather constructed around a globally parallel methodology and by exploiting the geometric attributes of the domain problem being solved. The present invention provides a highly effective, potent solution method for the simulation systems or problems in connection with large-scale layered formations.

This method can be used in the serial processing simulation or parallel processing simulation application. The particular advantage however comes in the parallel processing application of the method. Therefore, the method is particularly suited for field-scale or large-scale simulation where parallel processing using multiple CPU computer system is required to solve problems which involve millions of grid cells and multiple component fluid description.

As explained above, practices primarily extend the existing serial solution methods, which are recursive. As also noted, this is done by using a type of domain decomposition method to access large-scale simulation in the parallel environment. This approach has attendant drawbacks, as discussed earlier.

The present invention exploits the geometry of the domain problem at hand, and provides a solution system which is naturally parallel and yet potent and effective to handle a substantially large range of the domain simulation problem.

As has been explained, the present invention does not require adding a layer of iterations to resolve inter-boundary effect of a tightly coupled system when the work to solve the system is partitioned into sub-domains to be processed in parallel by several CPU's concurrently. This removes the dependencies of the simulation results on the number of CPU's used to solve a given problem. Since there is no additional work needed going from serial to parallel application, the overhead is primarily only the communication cost for certain required boundary data of the adjacent partitions. The work count is the same in either case. The method, therefore, has high parallel efficiency (scalability) as compared to methods where the work count increases as the number of CPU's used increases.

The present invention provides the same processing result for the same problem regardless of the number of processors used to solve the problem. The work count is the same for the same problem. The processing overhead is in the needed inter-processor communication of model partition boundary data. While actual parallel scalability is implementation dependent, the method of the present invention naturally scales to a large number of processors. The number of processors used becomes primarily an issue of the ratio of the amount of in process computation versus inter-process communication cost.

The method of the present invention is well suited to the large-scale (field-scale) simulation of large petroleum reservoirs where typically the resulting model is too large to be solved on a single CPU computer. The present invention exploits certain attributes of the simulation problem to achieve several advantages in a parallel computation environment.

The method of the present invention produces a seamless approach for a user in a parallel processing environment to solve simulation problems. That is, the use of the method of the present invention normally does not require a user to be aware of the complication introduced by a parallel environment. Switching from a single CPU solution to a multiple CPU solution is nothing more than changing a number in the job script and the results thus produced are identical from one run to the next with different numbers of CPU's used. The only thing a user will notice is that by increasing the number of CPU's the turnaround time on a simulation run has decreased, yet the result is not changed.

The methods of the present invention are applicable to a wide range of commonly used discretization methods in use in reservoir simulation. The only requirement for the method is that the grid needs to be layered. This is in fact the natural geometry of the underground formations. The discretization methods handled include the popular structured grid method such as corner-point-geometry (CPG) and the block-centered, grids of variable thickness and depth. Semi-unstructured grids are also handled. These can be, for example, a PEBI or a CVFE type grid in the lateral dimension, while the vertical dimension is layered.

The method of the present invention is applicable to both the IMPES and FI discretization schemes. The present invention is also applicable to both layered structured grids and layered semi-unstructured grids. The present invention has advantages in the parallel implementation of a solution for a large-scale simulation system on a supercomputer with several central processing units (CPU's). These are problems which are too slow to be solved by conventional methods involving a single processor.

Having described the invention above, various modifications of the techniques, procedures, material, and equipment will be apparent to those in the art. It is intended that all such variations within the scope and spirit of the appended claims be embraced thereby.

The invention claimed is:

1. In a computerized reservoir simulation, the improved method of computerized simulation of state changes of fluids in an underground layered formation of the reservoir in the earth, comprising the steps of:

partitioning a formation layer into an unstructured grid formed of a number of laterally contiguous grid cells;

establishing for the grid cells representations of state changes for the grid cells with contiguous grid cells of the unstructured grid of the formation layer;

arranging the established representations of state changes for the grid cells into a matrix A according to the position in the formation of the grid cells;

partitioning the matrix A into a matrix P representing a diagonal plus layered component of the matrix A of the grid cells of the unstructured grid of the formation layer and another matrix B representing lateral connectivity of the matrix A of the laterally contiguous grid cells of the partitioned formation layer;

forming a matrix product E in the computer representing the matrix multiplication product of a negative inverse matrix $-P^{-1}$ of the matrix P with the matrix B;

performing series preconditioner matrix-vector multiplication operations in the computer as a series expansion based on the matrix product E;

applying a conjugate residual interactive matrix solution in the computer to solve the representations of the state changes of the fluids in the partitioned grid cells and obtain a residual;

repeating the steps of performing series preconditioner matrix-vector multiplication operations and applying a conjugate residual interactive matrix solution in the computer to solve for the representations of the state changes for the fluids of the partitioned grid cells until the obtained residual is within an established tolerance limit of accuracy;

storing the computerized simulation of representations of the state changes for the partitioned grid cells when the obtained residual is within the established tolerance limit of accuracy; and forming an output display of the stored computerized simulation of representations for the state changes of fluids in the underground layered formation of the reservoir.

2. The method of claim 1, wherein the stored computerized representations of state changes of fluids in the formation comprise single porosity, single permeability representations of changes.

3. The method of claim 1, wherein the stored computerized representations of state changes of fluids in the formation comprise dual porosity, dual permeability representations of changes.

4. The method of claim 1, wherein the stored computerized representations of state changes comprise representations of fluid movement in the grid cells.

5. The method of claim 1, wherein the stored computerized representations of state changes comprises representations of material balance of fluids in the grid cells.

6. The method of claim 1, wherein the computerized simulation is performed in parallel by an array of computer processors and further including the step assigning adjacent blocks of the laterally connected grid cells sharing a common boundary to adjacent computer processors in the array.

7. The method of claim 6, further including the step of communicating representations of the state changes for cells in blocks along a common boundary to the adjacent computer processors in the array assigned the adjacent blocks.

8. The method of claim 1, wherein the step of partitioning comprises the step of partitioning a plurality of formation layers into unstructured grids, the grids for the layers being formed of a number of laterally contiguous grid cells.

9. The method of claim 1, further including the step of:
repeating the step of partitioning a formation layer for additional layers of the underground layered formation.

10. The method of claim 9, further including the step of:
repeating the step of partitioning the matrix A into a matrix P representing a matrix diagonal plus layered component of the matrix A and layer connectivity of the grid cells of the unstructured grid of the additional formation layers and another matrix B representing lateral connectivity of the matrix A of the laterally contiguous grid cells of the additional partitioned formation layers.

11. A data processing system for computerized simulation of state changes of fluids in underground layered formations of a reservoir in the earth, the data processing system comprising:
a processor for performing the steps of:
partitioning a formation layer into an unstructured grid formed of a number of laterally contiguous grid cells;
establishing for the grid cells representations of state changes for the grid cells with contiguous grid cells of the unstructured grid of the formation layer;
arranging the established representations of state changes for the grid cells into a matrix A according to the position in the formation of the grid cells;
partitioning the matrix A into a matrix P representing a diagonal plus layered component of the matrix A of the grid cells of the unstructured grid of the formation layer and another matrix B representing lateral connectivity of the matrix A of the laterally contiguous grid cells of the formation layer;
forming a matrix product E in the computer representing the matrix multiplication product of a negative inverse matrix $-P^{-1}$ of the matrix P with the matrix B;
performing series preconditioner matrix-vector multiplication operations in the computer as a series expansion based on the matrix product E;
applying a conjugate residual interactive matrix solution in the computer to solve the representations of the state changes of the fluids in the partitioned grid cells and obtain a residual;
repeating the steps of performing series preconditioner matrix-vector multiplication operations and applying a conjugate residual interactive matrix solution in the computer to solve for the representations of the state changes for the fluids of the partitioned grid cells until the obtained residual is within an established tolerance limit of accuracy; and
a memory for storing the computerized simulation of representations of the state changes for the grid cells obtained by the processor when the obtained residual is within the established tolerance limit of accuracy;
a display for displaying the stored computerized simulation of representations for the state changes of fluids in the underground layered formation of the reservoir.

12. The data processing system of claim 11, wherein the stored computerized representations for state changes of fluids in the formation comprise single porosity, single permeability representations of changes.

13. The data processing system of claim 11, wherein the stored computerized representations for state changes of fluids in the formation comprise dual porosity, dual permeability representations of changes.

14. The data processing system of claim 11, wherein the stored computerized representations for state changes of fluids comprise representations of fluid movement in the grid cells.

15. The data processing system of claim 11, wherein the stored computerized representations for state changes of fluids comprise representations of material balance of fluids in the grid cells.

16. A data storage device having stored in a computer readable medium computer operable instructions for causing a data processor to simulate state changes of fluids in underground layered formations in the earth, the instructions stored in the data storage device causing the processor to perform the following steps:
partitioning a formation layer into an unstructured grid formed of a number of laterally contiguous grid cells;
establishing for the grid cells representations of state changes for the grid cells with contiguous grid cells of the unstructured grid of the formation layer;
arranging the established representations of state changes for the grid cells into a matrix A according to the position in the formation of the grid cells;
partitioning the matrix A into a matrix P representing a diagonal plus layered component of the matrix A of the grid cells of the unstructured grid of the formation layer and another matrix B representing lateral connectivity of the matrix A of the laterally contiguous grid cells of the partitioned formation layer;
forming a matrix product E in the computer representing the matrix multiplication product of a negative inverse matrix $-P^{-1}$ of the matrix P with the matrix B;
performing series preconditioner matrix-vector multiplication operations in the computer as a series expansion based on the matrix product E;
applying a conjugate residual interactive matrix solution in the computer to solve the representations of the state changes of the fluids in the partitioned grid cells and obtain a residual;
and repeating the steps of performing series preconditioner matrix-vector multiplication operations and applying a conjugate residual interactive matrix solution in the computer to solve for representations of the state changes for the fluids of the partitioned grid cells until the obtained residual is within an established tolerance limit of accuracy;
storing the computerized simulation of representations of the state changes for the partitioned grid cells when the obtained residual is within the established tolerance limit of accuracy; and
forming an output display of the stored computerized simulation of representations for the state changes of fluids in the underground layered formation of the reservoir.

17. The data storage device of claim 16, wherein the stored computerized representations for state changes of fluids in the formation from the step of storing comprise single porosity, single permeability representations of changes.

18. The data storage device of claim 16, wherein the stored computerized representations for state changes of fluids in the formation from the step of storing comprise dual porosity, dual permeability representations of changes.

19. The data storage device of claim 16, wherein the stored computerized representations for state changes of fluids in the formation from the step of storing comprise representations of fluid movement in the grid cells.

20. The data storage device of claim 16, wherein the stored computerized representations for state changes of fluids in the formation from the step of storing comprise representations of material balance of fluids in the grid cells.

* * * * *

UNITED STATES PATENT AND TRADEMARK OFFICE
CERTIFICATE OF CORRECTION

| | |
|---|---|
| PATENT NO. | : 7,596,480 B2 |
| APPLICATION NO. | : 11/106300 |
| DATED | : September 29, 2009 |
| INVENTOR(S) | : Larry S. Fung et al. |

It is certified that error appears in the above-identified patent and that said Letters Patent is hereby corrected as shown below:

Title page, Item [*] Notice: Delete "by 182 days" and insert -- by 366 days --.

Page 18

Col. 13 Line 2 Delete the word "comprises" insert the word -- comprise --.

Signed and Sealed this

Thirty-first Day of August, 2010

David J. Kappos
*Director of the United States Patent and Trademark Office*